(12) United States Patent
Kruger et al.

(10) Patent No.: US 8,903,856 B2
(45) Date of Patent: Dec. 2, 2014

(54) METHOD AND APPARATUS FOR PRECISION INTEREST MATCHING

(71) Applicant: Absio Corporation, Littleton, CO (US)

(72) Inventors: Daniel L. Kruger, Evergreen, CO (US); Mitchell J. Tanenbaum, Littleton, CO (US); David A. Kruger, Frisco, TX (US)

(73) Assignee: Absio Corporation, Littleton, CO (US)

( * ) Notice: Subject to any disclaimer, the term of this patent is extended or adjusted under 35 U.S.C. 154(b) by 0 days.

(21) Appl. No.: 13/645,214

(22) Filed: Oct. 4, 2012

(65) Prior Publication Data

US 2013/0086110 A1 Apr. 4, 2013

Related U.S. Application Data

(60) Provisional application No. 61/543,215, filed on Oct. 4, 2011, provisional application No. 61/567,501, filed on Dec. 6, 2011.

(51) Int. Cl.
  *G06F 17/30* (2006.01)
(52) U.S. Cl.
  CPC ............................... *G06F 17/30867* (2013.01)
  USPC ......................................................... 707/770
(58) Field of Classification Search
  None
  See application file for complete search history.

(56) References Cited

U.S. PATENT DOCUMENTS

| | | | | |
|---|---|---|---|---|
| 7,424,510 B2 * | 9/2008 | Gross et al. | ................... | 709/203 |
| 2009/0011740 A1 | 1/2009 | Aggarwal et al. | | |
| 2011/0055024 A1 * | 3/2011 | Shen | ......................... | 705/14.72 |
| 2011/0247038 A1 | 10/2011 | Roberts et al. | | |
| 2012/0117141 A1 * | 5/2012 | Beaver et al. | ................. | 709/203 |
| 2013/0086603 A1 | 4/2013 | Kruger et al. | | |

FOREIGN PATENT DOCUMENTS

WO   WO 2008/073594   6/2008

OTHER PUBLICATIONS

International Search Report and Written Opinion for International (PCT) Patent Application No. PCT/US2012/058676, mailed Feb. 22, 2013, 9 pages.
Official Action for U.S. Appl. No. 13/645,218, mailed Jan. 17, 2014 6 pages, Restriction Requirement.
International Preliminary Report on Patentability for International (PCT) Patent Application No. PCT/US2012/058676, mailed Apr. 17, 2014, 7 pages.
Official Action for European Patent Application No. 12783724.3, dated Jun. 5, 2014, 2 pages.
Official Action for U.S. Appl. No. 13/645,218, mailed Jun. 6, 2014, 14 pages.

* cited by examiner

*Primary Examiner* — Jay Morrison
(74) *Attorney, Agent, or Firm* — Sheridan Ross P.C.

(57) ABSTRACT

Methods and systems for delivering content to users are provided. More particularly, a search server applies server side profile information to perform an initial search for content. That content or metadata representing the content is returned to the client device. A client application running on the client device can then apply client side profile information to refine or filter the initial search results. Content identified through the application of the client side profile information can then be obtained if it has not already been downloaded to the client device, and presented to the user. Client side profile information can include information that the user does not wish to disclose, information regarding content currently being accessed by the user, and/or information regarding holes or space available for the presentation of content to the user.

24 Claims, 6 Drawing Sheets

METHOD AND APPARATUS FOR PRECISION INTEREST MATCHING

CROSS-REFERENCE TO RELATED APPLICATIONS

This application claims the benefit of U.S. Provisional Patent Application Ser. No. 61/543,215, filed Oct. 4, 2011, and U.S. Provisional Patent Application Ser. No. 61/567,501, filed Dec. 6, 2011, the entire disclosures of which are hereby incorporated herein by reference.

FIELD

Methods and apparatuses for precision interest matching are provided. More particularly, methods and systems for providing selected content to a client are provided.

BACKGROUND

Computer networks such as the Internet provide a common means for obtaining content or other information. For example, searches can be performed over the worldwide web in response to queries provided by or on behalf of a user. The results of the search can be returned to the user in the form of an ordered list. The user can then select and review items included in the list of results and/or can make further queries in order to generate additional sets of search results.

In order to generate revenue in connection with the services offered over public networks such as the Internet, websites often sell advertising space. The advertisements that are presented by a web page can be selected based on information known or inferred about the user. For example, advertisements can be selected for presentation to a user based on search queries that have been entered by the user in the past.

In an effort to provide advertisements that are more precisely targeted to the user, search engines or other websites can aggregate information about the user. Such information can include a history of searches, web pages visited, and other information obtained from the user or derived from the user's actions. However, this collection of information raises privacy concerns. In addition, the current interests of the user may not be accurately inferred from collected information, for example where the user is pursuing new or different interests. As another example, advertising about a vacation destination after the person has returned from vacation may be presented as a result of search information aggregated from prior to the user's vacation.

In connection with the delivery of relevant content, whether advertising or otherwise, to a user, it is valuable to have detailed information about the user and about the specific information or content that the user is then interested in receiving. For example, demographic information regarding the user can help advertisers or providers of content generally to provide content desired by or of interest to the user. However, many users are reluctant to provide detailed demographic information, or other information that can be used to identify the user. As a result, a user faces a choice of disclosing information about themselves or their current interests, or receiving useless content. In addition, content providers, which can include advertisers, are unable to accurately determine the current interests of the user. Content providers, both advertisers and publishers, believe they have the right to discern, collect, merge with data from other sources, aggregate and sell any data they can regarding their users and use this data to track user activity across multiple web sites and email communications, reinforcing content consumers concerns regarding privacy and security.

SUMMARY

Embodiments of the present invention are directed to providing systems and methods that are capable of delivering precisely selected content, based on the content provider and content consumer (publisher and user) needs, to a user while requiring that the user disclose no or limited information about themselves or their current interests to the content provider (e.g. advertiser or publisher). More particularly, embodiments of the disclosed invention include a client application that provides an interface with the user or an interface to another application through an application programming interface (API). Through this user interface or API, the user can provide personal information, and information regarding content that is relevant to the user or that the user is otherwise interested in receiving. The personal information and information about the content that the user is interested in receiving can be stored as part of one or more sets of profile information. Selected portions of the profile information can be used to generate queries that are provided to a search server. The search server can run one or more searches in response to receiving the queries. Metadata concerning the content included in search results can be returned to the client by the search server. The client application can then apply further profile information, to select items of content represented by the metadata to download to the client device.

The delivery of only selected information to a search server allows searches for desired or relevant content to be performed by the search server, while providing confidentiality or privacy. In particular, information that is considered particularly sensitive is not delivered to the search server. Moreover, at least initially, the search query information is not delivered to an advertiser or content provider at this point at all. In particular, the search server can protect the information the client device provides to the search server. The client can authorize the search server to release selected information in a non-anonymous fashion at the client's choice, for example as a condition of using the content or specific anonymous information after the fact as marketing demographics. Additionally, the search server does not retain, aggregate or otherwise keep this query data. The user can choose, via the user interface or API, to provide a controlled set of information about themselves anonymously and possibly get paid or otherwise compensated for that information. In accordance with embodiments of the present invention, information that is sensitive can be used to refine or filter the search results on the client device, and to determine the content that is actually presented to the user. In addition, because embodiments provide metadata about content, rather than the content itself, the delivery of the metadata to the client device can be performed with fewer resources than if the content itself were delivered as part of the initial search results.

In accordance with embodiments of the disclosed invention, the refinement of the search results can be performed by the client application automatically, through application of additional profile information. Moreover, after selecting particular items of content through the application of the additional profile information, the client application can download that content and store copies of the content locally. The user can then view that content at any time after the content has been downloaded. Alternatively, content can be streamed to the client device and viewed by the user at or about the time that it is received at the client device. In accordance with still other embodiments, content can be downloaded to the client device based on the initial search performed by the search server, and that content can then be filtered based on various criteria by the client application.

In accordance with further embodiments of the disclosed invention, the communications, including the exchange of profile information, metadata, and content, can be performed securely, for example through the application of encryption techniques. In accordance with still further embodiments, the client application can provide notification to an authority, for example to the search server, when metadata and/or items of content are accessed by the user of the client device.

Additional features and advantages of embodiments of the present invention will become more readily apparent from the following description, particularly when taken together with the accompanying drawings.

DETAILED DESCRIPTION

Figure 1:
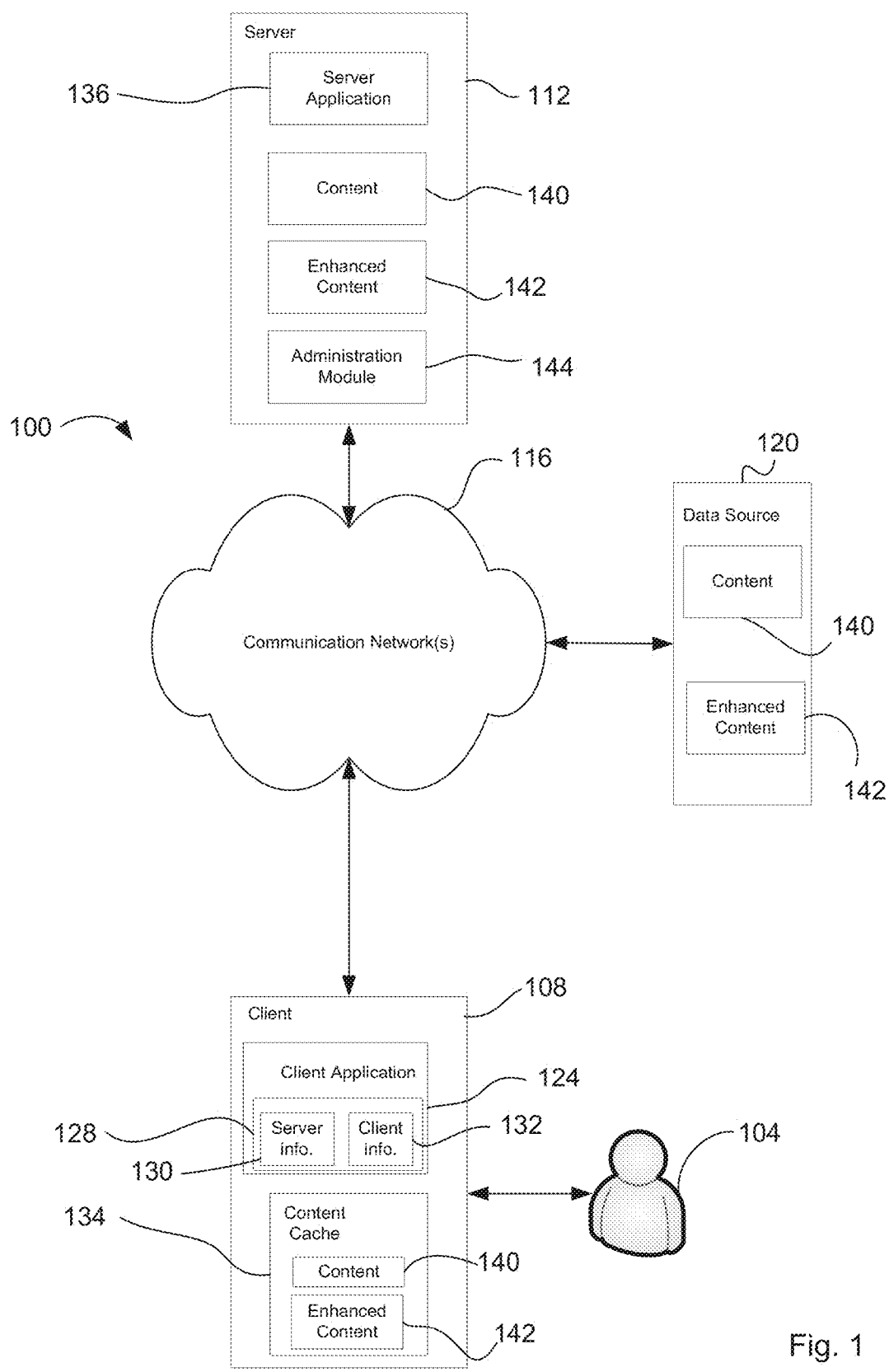
FIG. 1 depicts elements of a system for identifying and delivering content in accordance with embodiments of the present invention.

FIG. 1 depicts aspects of a system 100 for providing selected or matched content to a user 104 in accordance with embodiments of the present invention. In general, the system 100 includes one or more client devices 108 interconnected to a search server 112 by one or more communication networks 116. The system 100 can additionally include one or more data sources 120 in communication with the client device 108 and/or the search server 112 through one or more of the communication networks 116.

The client device 108 may comprise a general purpose computer, such as but not limited to a laptop or desktop personal computer, a tablet computer, a smart phone, or other device capable of communications over a communication network 116 and capable of presenting content to an associated user 104. The client device 108 may also comprise a processing unit that is interconnected to an affiliated input/output device. For instance, a client device 108 can include a set-top box operated in connection with a tablet computer. The client device 108 includes and/or executes a client application 124 in connection with the identification of content and the presentation of content to the user 104. Accordingly, the client application 124 may comprise application programming stored on or accessible to the client device 108, that is executed by or on behalf of the client device 108 in connection with the identification and presentation of content. The client application 124 may operate in association with profile information 128 that is stored or maintained as one or more user profiles. As described in greater detail elsewhere herein, profile information 128 can include information that is used to locate and identify content for presentation to the user 104. The information can include server side profile information 130 that is provided to the search server 112, either directly or in the form of a query formulated locally, and a second set of information that is reserved or retained locally as client side profile information 132. More particularly, the server side profile information 130 can be used to obtain initial or rough search results, and does not need to include information that individually identifies the user 104. The client side profile information 132 can be used to select content included in the initial search results to download to the client device 108 and/or to present to the user 104. The client device can also include a content cache 134, comprising items of content 140 and/or items of enhanced content 142 identified by the search server 112 that have been downloaded to the client device 108. Information or content 140, 142 in the content cache 134 can be held on the client device 108 until it is viewed by the user 104, discarded as a result of filtering, performed on the client device 108, or until the content has become stale.

The search server 112 can include a general purpose computer or server computer. Moreover, the search server 112 may comprise one or more devices that perform functions in support of the identification and provision of content 140 and/or enhanced content 142 to a client device 108 over the communication network 116. The search server 112 can include or implement a server application 136. The server application 136 can receive queries, and/or can formulate queries based on server side profile information 130 that is provided to the search server 112 by a client device 108. Alternatively or in addition, the server application can run queries on behalf of one or more client devices 108 based on generic, or non-client device 108 sourced profile information or search criteria. The server application 136 can identify content 140 and/or enhanced content 142 by applying the search or query using various techniques. For example, the server application 136 can operate by passing a query to a publicly available search engine, such as Google™, Bing™, or Yahoo™ search, or by itself implementing a search engine function. The server application 136 can identify or collect links to content 140, 142 available through or stored on the search server 112, or on some other data source 120. For example, the server application 136 can operate to locate content on the worldwide web (WWW), in a private intranet, or in public or private databases. As described in greater detail elsewhere herein, the server application 136 can further operate to provide lists of identified content 140, 142 and metadata concerning that identified content to a client device 108. The search server 112 can also facilitate the delivery of particular items of content 140, 142 selected from lists of content 140, 142 by a client device 108 to that client device or other client devices 108. In accordance with still other embodiments, the server application 136 can perform or support administrative functions. For example, information regarding content 140, 142 downloaded to the client device 108 and/or presented by a client device 108 to an associated user 104 can be collected by the server application 136. Such information can be provided to an administration module 144. The administration module 144 can perform functions related to billing a user 104 for accessing particular items of content 140, 142, performing digital rights management functions with respect to items of content 140, 142, billing advertisers in connection with presenting particular items of content 140, 142 to a user 104, and the like.

The communication network 116 can include one or more networks capable of supporting communications between devices or nodes of the system 100, including but not limited to a client device 108, a search server 112, and a data source 120. Examples of communication networks 116 include the Internet or any wide area network (WAN), local area network (LAN), or networks in various combinations.

A data source 120 can, for example, comprise a server computer interconnected to the search server 112 and/or the client device 108 through the communication network 116. For example, a data source 120 can comprise a website or other public or proprietary source of content 140. As a further example, a data source 120 can comprise a public or proprietary database of content 140. A data source 120 can also include a source of enhanced content 142.

Figure 2:
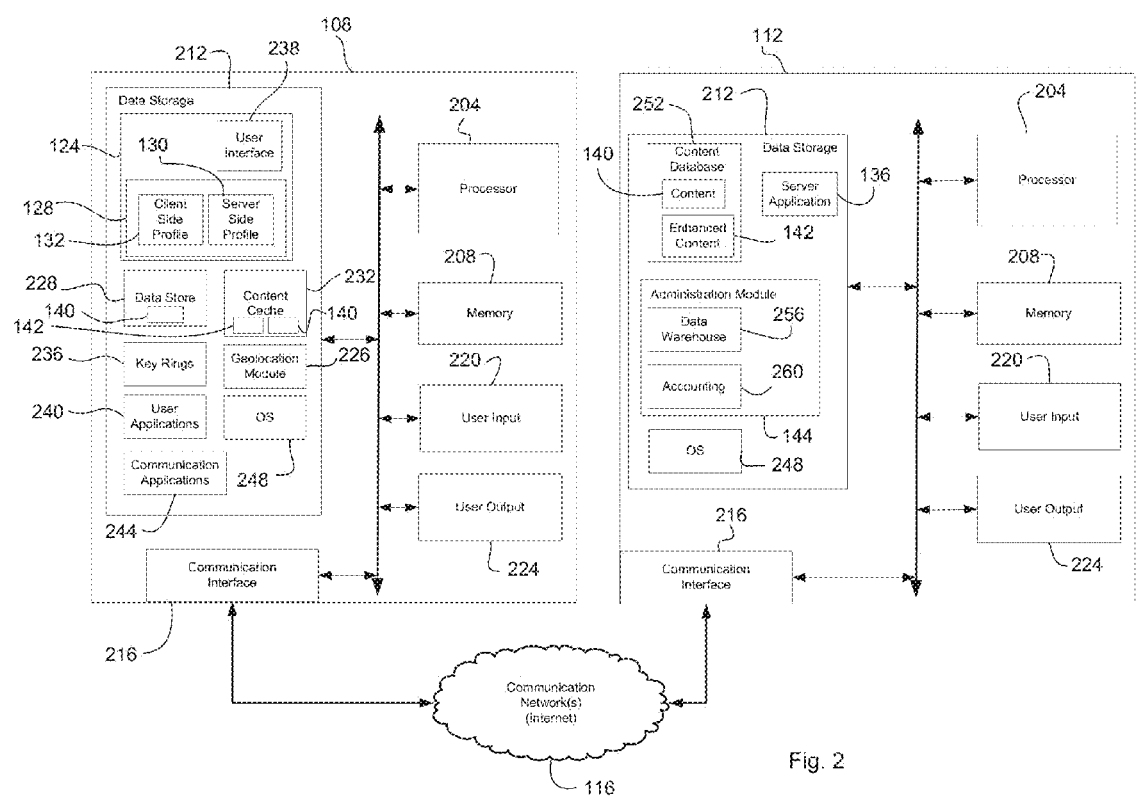
FIG. 2 is a block diagram depicting components of a system for identifying and delivering content in accordance with embodiments of the present invention.

FIG. 2 illustrates additional aspects of a system 100 in accordance with embodiments of the present invention, and in particular illustrates additional features and components of a client device 108 and a search server 112. The client device 108 can comprise a general purpose computer, smart phone, or other device capable of supporting communications over a communication network 116, and of running a suitable version of the client application 124. The search server 112 may comprise one or more server computers capable of communication over a communication network 116, and of running a suitable server application 136. In general, the client device 108 and search server 112 each include a processor 204, memory 208, data storage 212, and a communication or network interface 216. In addition, the client device 108 and/or the search server 112 can include one or more user input devices 220, such as a keyboard and a pointing device, and one or more output devices 224, such as a display and a speaker. A user input 220 and user output 224 device can comprise a combined device, such as a touch screen display. In accordance with still other embodiments, a client device 108 comprising a mobile device can include a geolocation module 226, such as a global positioning sensor and associated application programming.

The processor 204 may include any processor capable of performing instructions encoded in software or firmware. In accordance with other embodiments of the present invention, the processor 204 may comprise a controller or application specific integrated circuit (ASIC) having or capable of performing instructions encoded in logic circuits. The memory 208 may be used to store programs or data, including data comprising content 140. As examples, the memory 208 may comprise RAM, SDRAM, or other solid state memory. Alternatively or in addition, data storage 212 may be provided. The data storage 212 may generally include storage for programs and data. For instance, with respect to a client device 108, data storage 212 may provide storage for a client application 124, an object or data store 228, a content cache 232, content 140 (for example within the data store 228 and/or content cache 232), and key rings 236. As shown, the client application 124 can include or be associated with profile information 130 and a user interface module or function 238. Data storage 212 associated with a client device 108 can also provide storage for one or more user applications 240, communication applications 244, and/or operating system software 248. The data storage 212 associated with the search server 112 can include the server application 136, content 140, for example as part of one or more content databases 252, a data warehouse 256 and accounting data 260, for example maintained as part of the administration module 144, and operating system software 248.

Figure 3:
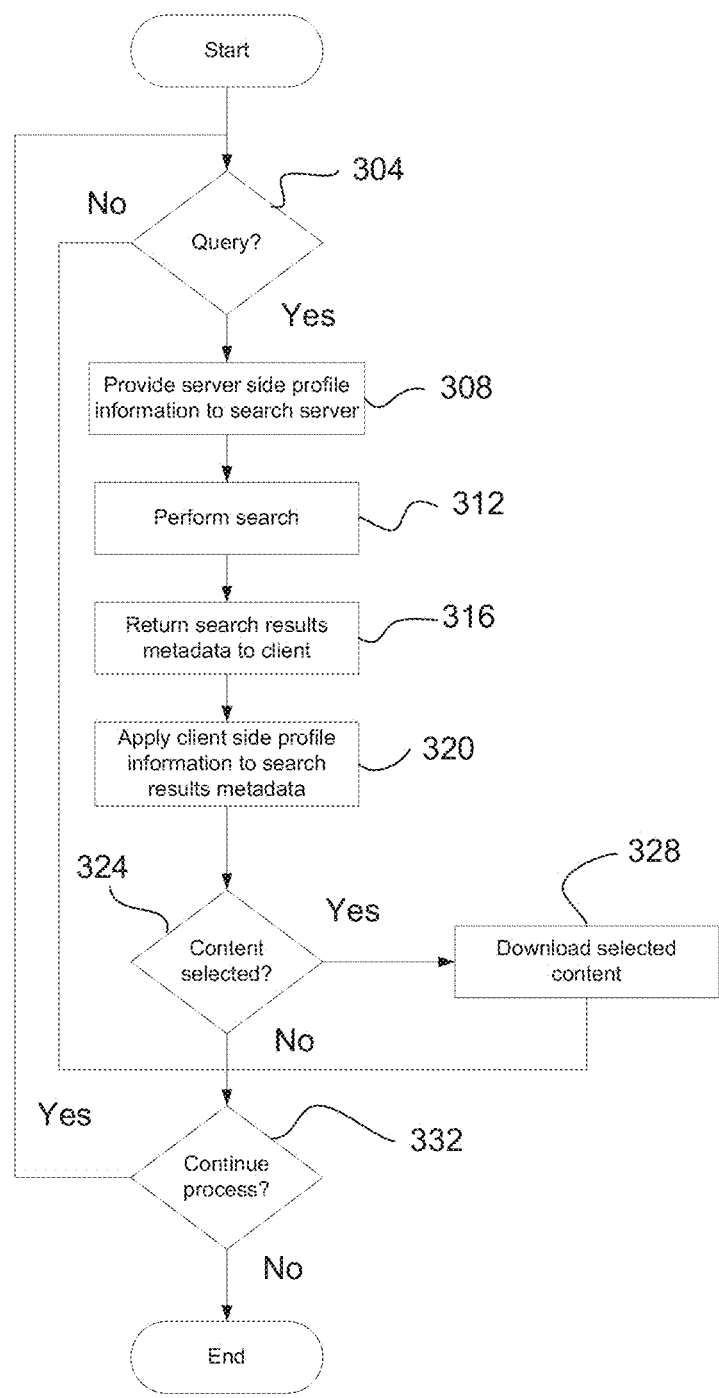
FIG. 3 is a flowchart depicting aspects of a process for identifying content in accordance with embodiments of the present invention.

FIG. 3 is a flowchart depicting aspects of a process presenting content to a user in accordance with embodiments of the present invention. Initially, at step 304, a determination is made as to whether a query has been initiated. A query can be initiated explicitly, for example through the receipt from a user 104 at a client device 108 of a search or query request. A query can also be initiated after a predetermined period of time has elapsed since a previous query for the same or a similar set of search criteria has been run. Accordingly, a query can comprise a watch that gathers particular information on behalf of a user or set of users automatically on a periodic basis or in response to a stimulus. In accordance with still other embodiments of the disclosed invention, a query can be initiated in response to a change in information contained in a profile 128, a change in the location of the user 104 or client device 108, or other change related to the system 100. The automatic initiation of a query, without an explicit request by a user 104, can be performed by the client application 124.

In response to the initiation of a query, server side profile information 130 can be provided by the client application 124 on or associated with the client device 108 to the search server 112 via the one or more communication networks 116 (step 308). In response to receiving the server side profile information 130, the server application 136 initiates a search (step 312). In initiating the search, the server application 136 can provide a received query to a search engine that is implemented by the server application 136 itself, or that is provided by an affiliated or otherwise available search engine. Alternatively, the server application 136 can formulate a query that uses or that is based on server side profile information 130, and can provide that query to a search engine. In accordance with still other embodiments, the query can be formulated by and/or received from an administrator or an administration function operating on or in association with the search server 112.

At step 316, search result metadata is returned to the client device 108. The search results metadata can be collected by the server application 136 from the search results obtained by the search engine. In accordance with embodiments of the disclosed invention, the search results metadata can comprise various data concerning content 140 identified by the server application 136, such as by title, author, synopsis or other brief summary, excerpt, subject matter, classification, unique ID, date of creation, and date of an event or events to which the content 140 is related. As can further be appreciated by one of skill in the art, the metadata will typically comprise a fraction of the amount of data of the content itself. Accordingly, the metadata can be provided to a client device 108 over a communication network 116 using less bandwidth and other resources than if the full set of content 140 included in the search results were returned to the client device 108.

The client side profile information 132 is then applied to the search results metadata by the client application 124 (step 320). Alternatively or in addition, input provided by a user 104 can be applied to the search results metadata. Importantly, this additional information or search criteria is applied to the search results metadata at the client device 108. Accordingly, transmission of such client side profile information 132 across a communication network 116, and/or the release of such client side profile information 132 to the search server 112 is not required in order to refine the search results. In addition, the client device 108 is not required to be in communication with the search server 112 at the time the client side information 132 is applied. At step 324, a determination is made as to whether any items of content 140 have been selected from the search results metadata. If content has been selected, that content 140 can be downloaded (step 328). At step 332, a determination is made as to whether the process is to be continued. If the process is to be continued, it returns to step 304 to determine whether a query has been initiated. Alternatively, the process may end.

Figure 4:
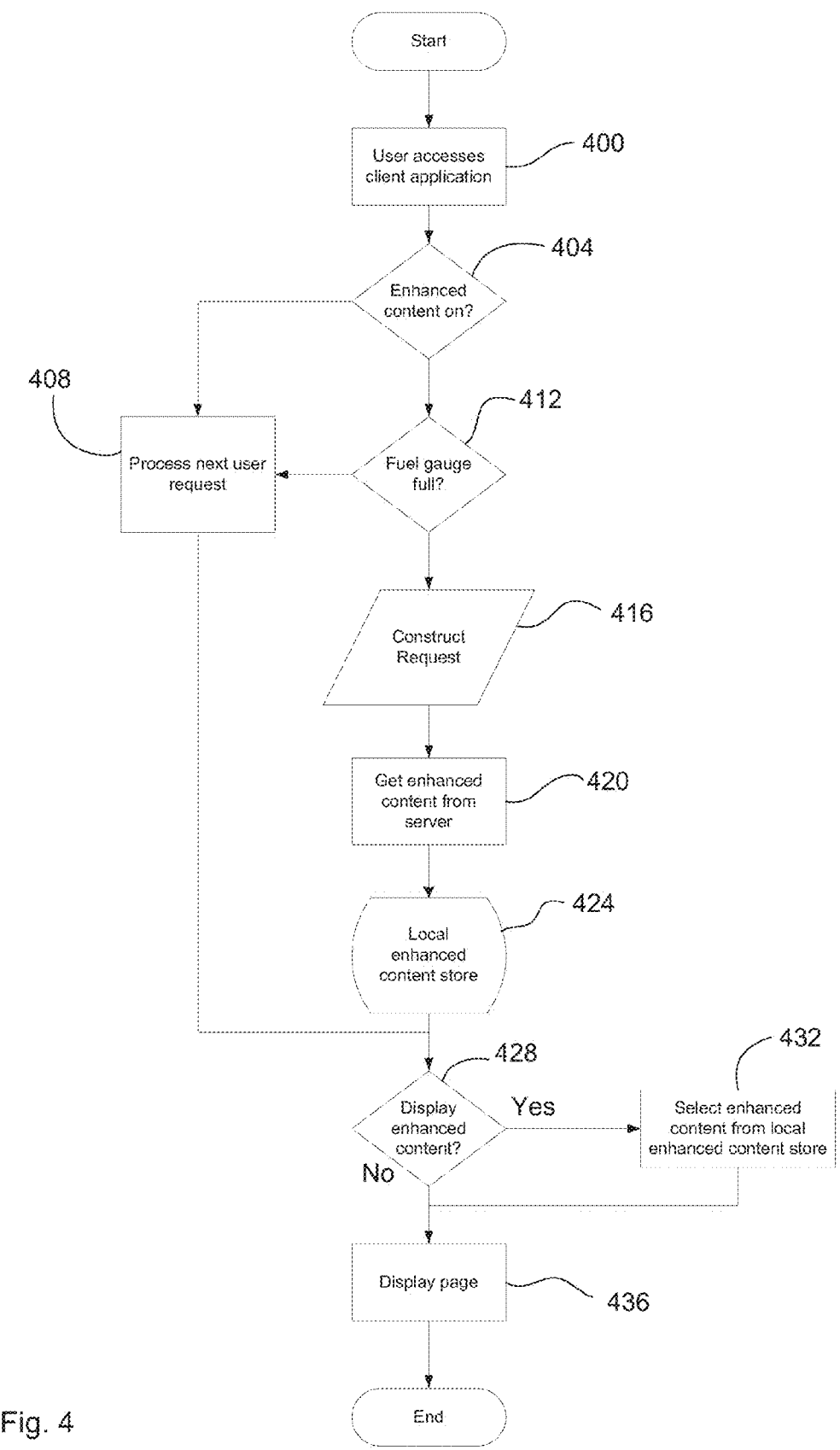
FIG. 4 is a flowchart depicting aspects of a process for presenting content to a user in accordance with embodiments of the present invention.

With reference now to FIG. 4, aspects of a process for presenting content to a user 104 in accordance with further embodiments of the present invention are depicted. More particularly, the selection and presentation of enhanced content or information 142, where enhanced content generally includes advertisements or items of information that may or may not be directly related to user 104 activities with respect to the client device 108 are illustrated. Although the description uses as examples enhanced content 142 comprising advertisements, embodiments of the system 100 can include locating and presenting enhanced content 142 other than advertisements that is determined to be of interest to the user 104. Initially, at step 400, the user 104 accesses the client application 124. A determination is then made as to whether an enhanced content function is on or has been enabled (step 404). If an enhanced content function has not been enabled, a next user 104 request is processed normally (step 408). If an enhanced content function has been enabled, a determination is next made as to whether an enhanced content fuel gauge indicates that an enhanced content cache 134 is full (step 412). If the enhanced content cache 134 is found to be full, the system processes the next user request normally (step 408).

If the content cache 134 is not full, a request is constructed (step 416). Construction of the request can include sending server side profile information 130 to the search server 112. As described in greater detail elsewhere herein, the server side profile information 130 can include information stored as part of profile information 128 on the client device 108, information concerning content 140 that is currently being accessed by the user 104, a current location of the user 104 or client device 108, information regarding the output capabilities of the client device 108, and/or information regarding user interface display metrics, including space within a user interface 238 display that is available to display or otherwise output an advertisement or other content. At step 420, using the constructed request, one or more items of enhanced content 142, such as but not limited to an advertisement or other content, is obtained from the search server 112 or from a data source 120 identified by the search server 112. The retrieved enhanced content 142 is then downloaded and placed in an enhanced content 142 store (e.g., a local ad store) included in the local content cache 134 on the client device 108 (step 424).

At step 428, after processing a next user request or placing retrieved enhanced content 142 in the local content cache 134, a determination is made as to whether an advertisement or other enhanced content 142 needs to be displayed to the user 104. The determination as to whether an advertisement or other enhanced content 142 needs to be displayed can be made based on various parameters, including terms of use related to the content 140 selected for display or other content 140 being accessed by the user 104, or other user 104 and/or administration selected parameters. If an advertisement or other content is to be displayed, that advertisement or enhanced content 142 is selected from the local enhanced content 142 store or content cache 134 (step 432). The selected advertisement or other enhanced content 142 is then displayed as part of a page of other information or content 140 being viewed by the user 104 (step 436). If it was determined that an advertisement or other enhanced content 142 does not need to be displayed, the user 104 is simply presented with a display of the page or other content 140 accessed in response to a user request. After displaying the page of information or content 140 at step 436, or processing a next user request at step 408, the process for selecting and displaying enhanced content 142 may end.

Figure 5:
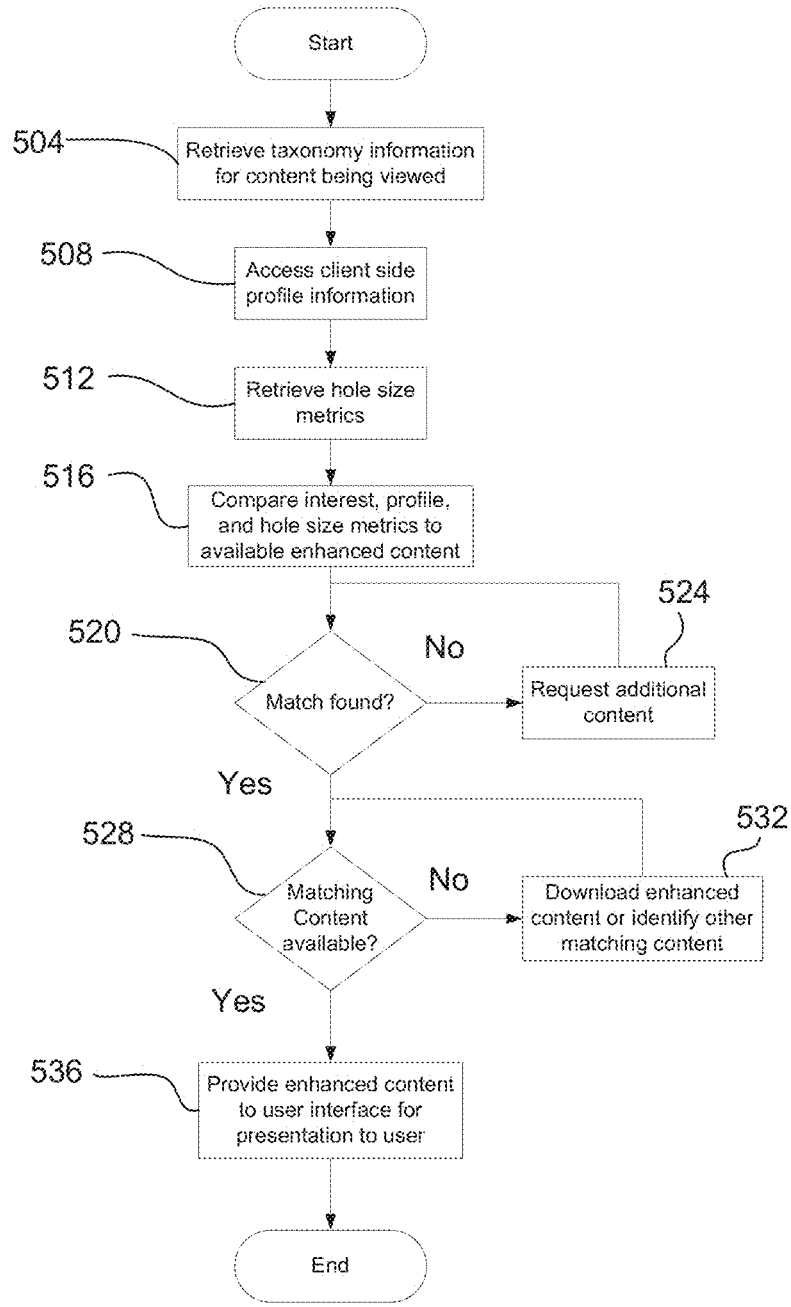
FIG. 5 is a flowchart depicting further aspects of a process for presenting selected content to a user in accordance with embodiments of the present invention.

FIG. 5 is a flowchart illustrating additional aspects of a process for determining whether to display enhanced content 142, such as but not limited to an advertisement, to a user 104. Initially, at step 504, taxonomy information is obtained from content 140 that is being accessed by the user 104. The taxonomy information generally includes information identifying the content 140 being viewed, and therefore provides information that can be used to identify the current interest of the user 104. At step 508, local or client side profile information 132 is accessed. In accordance with at least some embodiments, the client side profile information 132 can include user 104 preferences regarding enhanced content 142, such as advertisements or other information, that is presented to the user 104 while the user 104 is accessing other content 140. At step 512, enhanced content 142 "hole" size metrics are obtained from the user interface function 238 of the client application 124. These metrics may specify the dimensions or other characteristics of the current display and/or the user output 124 available to present a selected ad or other enhanced content 142. The taxonomy information, client side profile information 132 and the retrieved hole size metrics are then compared to enhanced content 142 in the local enhanced content 142 repository in the content cache 232 to identify an ad or other enhanced content 142 matching the current interest, profile and hole size criteria (step 516). At step 520, a determination is made as to whether a match has been found. If a match is not found, a request can be generated by the client application 124 for more enhanced content 142 metadata (step 524). This additional metadata can then be considered in view of client side profile information 132 and/or other criteria to identify enhanced content 142 that can be downloaded and stored in the content cache 232, for example in place of previously downloaded enhanced content 142.

If a match is found, a determination is made as to whether the matching enhanced content 142 has been downloaded to the content cache 232 (step 528). If the matching enhanced content 142 is not locally available, that enhanced content 142 can be downloaded, or other matching enhanced content 142 can be identified (step 532). The matching enhanced content 142 can then be obtained from the content cache 232 and is provided to the user interface 238 function of the client application 124 for rendering and display or other presentation to the user 104 through the user output 224 (step 536). After displaying the selected enhanced content 142, the process may end.

Figure 6:
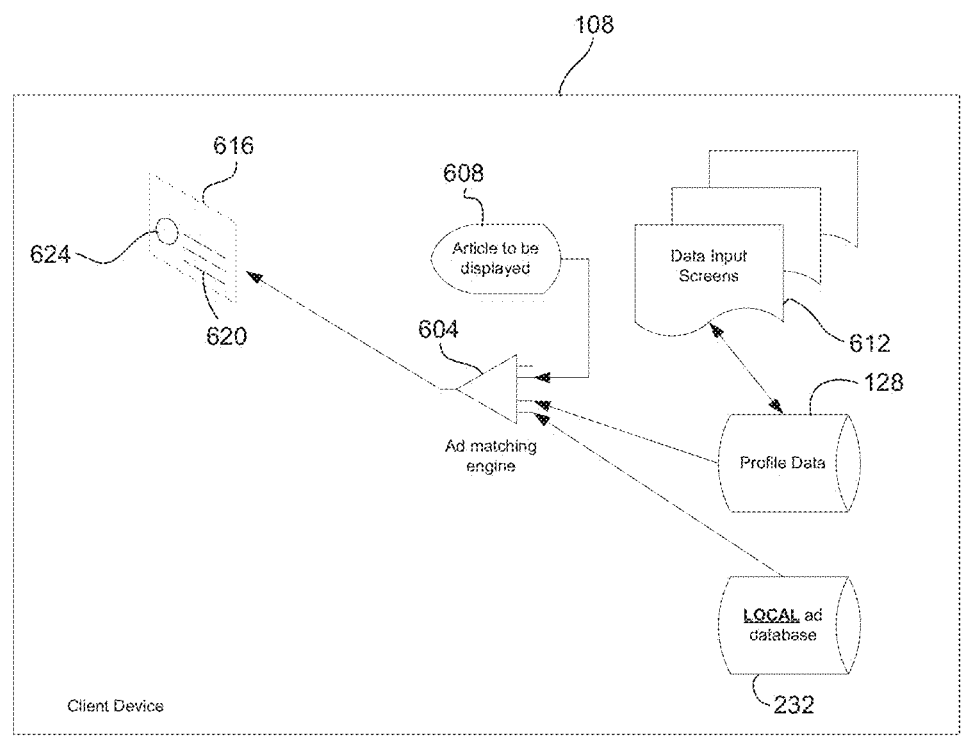
FIG. 6 depicts aspects of a process for matching advertisements or other content and presenting that selected content to a user in accordance with embodiments of the present invention.

FIG. 6 depicts aspects of a process for matching advertisements or other enhanced content 142 and presenting that selected enhanced content 142 to a user 104. More particularly, FIG. 6 depicts inputs to an advertisement matching engine function 604, for example implemented as part of the client application 124. These inputs include a selected article or other content 608 that is to be displayed to the user 104, profile information 128, and advertisements or other enhanced content 142 maintained in the local advertisement database or content cache 232. The article to be displayed 608 can include an article or other content 140 that the user 104 has selected, or that has been selected on behalf of the user 104, for example through operation and/or application of the user profile information 128. The profile data 128 can include information collected from the user 104, for example through data input screens 612 presented to the user 104 through a process initiation function implemented by the client application 124. The local advertisement database or content cache 232 can include advertisements or other enhanced content 142 that have been collected through operation of the client application 124 and the server application 136, and the application of profile information 128 as described herein. The result of the application of these various inputs by the advertisement matching engine 604 is a displayed page 616 that includes the article selected for display 620 and the advertisement selected for display 624. Moreover, the advertisement 624 occupies a space on the page that has been reserved or otherwise made available, for example through the initial formatting of the selected content 620 or through the operation of the client application 124.

Although various examples and embodiments have been described in which advertisements are selected and presented to a user, embodiments of the present invention are not limited to the selection and presentation of advertising content. Instead, embodiments of the disclosed invention can be used to select content 140 and/or enhanced content 142 wherever efficiency, security and/or privacy is a concern. More particularly, by performing an initial search using a subset of a user's profile information 128 comprising server side profile information 130, a user 104 can initiate or have initiated on their behalf the collection of an initial set of search results, without requiring that the user 104 transmit and/or otherwise disclose details of the search criteria that may compromise the security of confidential information and/or personal information. Instead, search criteria that may present security and/or privacy concerns is maintained on the client device 108, and is applied by the client application 124. In addition, the efficiency of the system 100 can remain high, because only metadata regarding content 140 and/or enhanced content 142 needs to be returned as part of an initial set of search results. In particular, the initial search results can be refined by applying client side profile information 132 to the returned metadata. Content 140 and/or enhanced content 142 identified through this process can then be downloaded where a match is found using the metadata. Embodiments of the disclosed invention can also provide relevant content 140 to a user 104 even where the user 104 didn't know to look for that content 140, based on a watch or query, and filtering performed by application of client side profile information 132.

In one exemplary scenario, embodiments of the invention can provide relevant content 140 and/or enhanced content 142 to a user 104 without compromising security or privacy concerns of the user 104. For instance, a query can be initiated on behalf of a user 104 by sending server side profile information 130 to the search server. The sending of the server side profile information 130 can be initiated when a geolocation module 226 on the client device 108 signals the client application 124 that the user 104 has entered a particular geographic region. Moreover, this can be done without sending that location information to the search server 112. The client device 108 can then be provided with metadata regarding a range of content 140, and a set or list of particular items of content 140 and/or enhanced content 142 can then be refined securely by applying client side profile information 132 at the client device 108. This client side profile information 132 can include the client device 108 location. Accordingly, a targeted search can be performed without requiring disclosure of sensitive client side profile information 132 to the search server 112 or any other device or node. For instance, the security clearance, location, mission or other information associated with the user 104 can be maintained solely on the client device 108.

In accordance with still further embodiments of the disclosed invention, a taxonomy can be applied to identify content 140 and/or enhanced content 142 that is likely relevant and therefore of interest to the user 104. In particular, a taxonomy can be used to identify characteristics of content 140 being viewed currently by a user 104, and to obtain additional content 140 and/or enhanced content 142 that is commensurate with the subject matter or other indicia of the content 140 being viewed. In this way, information in the form of content 140 and/or enhanced content 142 that is highly relevant to the current activity or interest of a user 104 can be located and delivered to that user 104.

Systems 100 and methods in accordance with embodiments of the disclosed invention allow for the delivery of profile information 132 and content 140 and/or enhanced content 142 using secure mechanisms. Accordingly, not only is security and privacy enhanced through the division of profile information 128 into server side profile information 130 and client side profile information 132, but information that is transmitted across a communication network 116, whether that information comprises profile information 128, metadata, content 140, and/or enhanced content 142, can be encrypted. Encrypted content can be accessed through the application of one or more keys, for example maintained in key rings 236, to access.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method, comprising:
   initiating a search from a client device, wherein initiating a search includes providing server side profile information from an application running on the client device to a search server;
   receiving at the client device metadata concerning results of the search, wherein the metadata concerning results of the search includes metadata related to each of a plurality of items of content;
   applying on the client device client side profile information to the metadata concerning results of the search;
   as a result of applying the client side profile information, selecting at least a first item of content included in the plurality of items of content;
   obtaining by the client device a copy of the first item of content;
   determining whether a local enhanced content store included in the client device contains less than a first predetermined amount of enhanced content;
   in response to determining that the local enhanced content store contains less than the first predetermined amount of enhanced content, obtaining one or more items of enhanced content and storing the one or more items of enhanced content in the local enhanced content store;
   selecting a first item of enhanced content stored in the local enhanced content store for display, wherein selecting the first item of enhanced content for display includes matching hole size metrics for the first item of content and hole size criteria for the first item of enhanced content and further includes determining a current interest of a user of the client device based on metadata concerning the first item of content;
in response to selecting the first item of enhanced content stored in the enhanced content store, presenting the first item of enhanced content and the first item of content, wherein presenting the first item of enhanced content and the first item of content includes displaying at least a portion of the first item of enhanced content and at least a portion of the first item of content to the user of the client device simultaneously, wherein the first item of enhanced content is not included in the first item of content.

2. The method of claim 1, further comprising:
storing the copy of the first item of content on the client device.

3. The method of claim 1, further comprising:
storing the copy of the first item of content on the client device, wherein the stored first item of content is presented to the user of the client device.

4. The method of claim 1, further comprising:
notifying a central authority that the first item of content has been presented to a user of the client device.

5. The method of claim 3, further comprising:
in response to presenting the first item of content to a user of the client device:
notifying a provider of the first item of content that the first item of content has been presented to a user of the client device;
one of: the provider of the first item of content paying a fee to the central authority, or the central authority paying a fee to the provider of the first item of content.

6. The method of claim 1, further comprising:
selecting a plurality of items of content, wherein the plurality of items of content include the first item of content;
obtaining by the client device a copy of each item of content included in the selected plurality of items of content.

7. The method of claim 6, further comprising:
storing the copy of each item of content included in the selected plurality of items of content on the client device;
presenting the first item of content to a user of the client device;
discarding a second item of content included in the selected plurality of items of content.

8. The method of claim 7, further comprising:
determining that the second item of content has become stale, wherein the second item of content is discarded in response to that determination.

9. The method of claim 1, wherein the first item of content is obtained using a first communication link between the client device and a communication node, and wherein the first communication link is not active when the first item of content is presented to the user of the client device.

10. The method of claim 1, further comprising:
creating a first set of profile information including first client side profile information and first server side profile information, wherein the first server side profile information comprises a first query;
storing at least the first client side profile information on the client device, wherein the first server side profile information is provided to the search server in the form of the first query.

11. The method of claim 10, further comprising:
creating a second set of profile information including second client side profile information and second server side profile information, wherein the second server side profile information comprises a second query;
storing at least the second client side profile information on the client device;
providing the second server side profile information to the search server in the form of the second query.

12. The method of claim 1, further comprising:
using the search server, performing a search using the server side profile information;
collecting search results at the search server;
returning the metadata concerning results of the search to the client device.

13. The method of claim 1, wherein the metadata concerning results of the search is returned in a first batch at a first point in time, wherein the first batch includes results of a first search performed prior to the first point in time, wherein additional metadata concerning results of the search is returned in a second batch at a second point in time, wherein the second batch includes results of a second search performed prior to the second point in time and after the first point in time.

14. The method of claim 1, wherein the determination as to whether a selected item of enhanced content stored in the enhanced content store needs to be displayed includes:
obtaining taxonomy information from content that is being accessed by a user;
applying the taxonomy information to select the selected item of enhanced content.

15. The method of claim 1, wherein determining whether a selected item of enhanced content stored in the local enhanced content store needs to be displayed includes obtaining by the application running on the client device the client device location and applying the client device location to determine whether a selected item of enhanced content stored in the local enhanced content store needs to be displayed.

16. The method of claim 1, wherein initiating a search from a client device includes initiating the search after receiving a signal that the client device has entered a particular geographic region.

17. The method of claim 16, wherein the signal that the client device has entered a particular geographic region is provided by a geolocation module on the client device.

18. The method of claim 1, wherein the selected item of enhanced content is an advertisement.

19. A system for delivering content, comprising:
a client device, including:
a processor;
a communication interface;
data storage;
client side profile information stored on the data storage;
a client application stored on the data storage that is executable by the processor, wherein the client application is operable to apply the client side profile information to metadata concerning a plurality of items of content and to select a subset of the plurality of items of content to download using the communication interface;
an enhanced content cache, wherein enhanced content is obtained and stored in the enhanced content cache in response to a determination by the client application that the enhanced content cache is not full, wherein a first item of enhanced content is selected from the enhanced content cache and is presented to a user of the client device in response to criteria that includes a plurality of factors, wherein information concerning a first item of content included in the plurality of items of content that is being presented to the user is one of the plurality of factors, wherein selecting the first item of enhanced content for presentation includes matching hole size metrics for the first item of content and hole size criteria for the first item of enhanced content and further includes determining a current interest of a user of the client device based on metadata concerning the first item of content, wherein the first item of enhanced content presented to the user is retrieved from the enhanced content cache, wherein presenting the first item of enhanced content and the first item of content includes displaying at least a portion of the first item of enhanced content and at least a portion of the first item of content to the user of the client device simultaneously, and wherein the item of enhanced content is not included in the first item of content.

20. The system of claim 19, wherein the client application is further operable to store the subset of the plurality of items of content in the data storage.

21. The system of claim 20, further comprising:
a user output, wherein the client application is further operable to present the item of content included in the subset of the plurality of items of content and the item of enhanced content to the user through the user output.

22. The system of claim 21, wherein the client application is further operable to send a signal to a search server when at least a first item of content included in the subset of the plurality of items of content is presented by the user output.

23. The system of claim 22, wherein the communication interface is operably interconnected to a network to obtain the plurality of items of content from the search server and to store the subset of the plurality of items of content in the data storage, and wherein the communication interface is not interconnected to the network while the content is displayed to the user.

24. The system of claim 19, wherein information regarding a geographic region in which the client device is located is another one of the plurality of factors.

* * * * *